United States Patent Office 2,852,483
Patented Sept. 16, 1958

2,852,483

METHOD OF PLASTICIZING A POLYURETHANE-POLYETHER AND COMPOSITION THEREBY OBTAINED

William L. Mason, Pequea Township, Lancaster County, Pa., assignor to Armstrong Cork Company, Lancaster, Pa., a corporation of Pennsylvania No Drawing. Application February 20, 1956
Serial No. 566,362

11 Claims. (Cl. 260—31.6)

This invention relates generally to polyurethanes, and more particularly to polyurethane-polyethers. Still more particularly, the invention relates to a method of plasticizing or imparting good processing characteristics to polyurethane-polyethers. The invention also relates to the composition thereby obtained.

The polyurethane-polyethers with which the present invention is concerned may be prepared by using tetrahydrofurane as a starting point. The tetrahydrofurane is treated at elevated temperatures in the presence of an acid catalyst. Such treatment opens the ring and forms a polyether which is terminated with a hydroxyl group on each end. The hydroxyl-terminated polyether is admixed at room temperature with about 1–10% by weight of the mixture of glycol or polyhydroxy alcohol containing the equivalent of more than two hydroxyl groups. Additionally, there is added a symmetrical polycyclic aromatic diisocyanate in an amount such that the isocyanate equivalents are slightly less than the combined hydroxyl equivalents of the polyether and the polyol. On heating, there will be formed a solid, hard, rubbery polymer resulting from both chain extension of the polyol and the polyether by the diisocyanate and from network formation of the chain extended molecules by the diisocyanate. The Mooney viscosity, MS–4 at 212° F., is 55–75. Since there are no free diisocyanate groups in the resulting polymer, the polymer is stable under normal conditions. And since the polymer is terminated with hydroxyl groups, it can participate in further reactions with hydroxyl-reactive substances. The term stable hydroxyl-terminated, polyurethane-polyether as used in the specification and claims is intended to denote the above-described polymer.

The polyurethane-polyether is difficult to process. In such situations, it is known to add suitable plasticizers to the composition in order to impart good processing characteristics. However, the addition of normal plasticizer such as the ester type plasticizers, the organo phosphates, or alkyd plasticizers, while imparting good processing characteristics on the mill, also serve to plasticize the final product. In some applications, such as resilient fiber processing roll covers, tire treads, and outsoles, a plasticized composition is undesirable; the roll covers should be as tough as possible. Thus, normal methods of plasticizing polyurethane-polyethers are undesirable.

It is the primary object of the present invention to supply a plasticizer for polyurethane-polyethers which will impart good processing characteristics to the polyurethane-polyether but which will cause little change in the final product as opposed to the unplasticized composition. To this end the invention contemplates adding to the polyurethane-polyether an oxygen-containing, isocyanato-terminated polyurethane having a molecular weight in the range of about 1,500–4,500 and preferably about 2,500–3,500 and having a viscosity in the range of about 1,000–20,000 and preferably about 2,000–3,000 centipoises at 70° C.

Although the plasticizer useful in the present invention may be prepared in several ways, it must bear an isocyanato group at each end of the molecule and it must be within the above-stated ranges of molecular weight and viscosity. One method of preparing the polyurethane plasticizer is to utilize as a starting material the hydroxyl-terminated polyether described above which results from an acid-catalyzed treatment of tetrahydrofurane. To such a hydroxyl-terminated polyether there should be added an organic diisocyanate having no other reactive groups on the molecule except for the isocyanato groups. In this case, however, the amount of the organic diisocyanate to be added to the hydroxyl-terminated polyether should be sufficient to give an excess of isocyanato groups over the hydroxyl groups; about 1.5 equivalents of isocyanate per hydroxyl equivalent will suffice. The result of the excess diisocyanate is to terminate the molecular chain with isocyanato groups. These conditions also prevent undue chain extension and eliminate network formation.

As an alternative to forming the plasticizer from a polyether and diisocyanate, it may be formed from a polyester and a diisocyanate so long as the above-stated molecular weight and viscosity limitations of the resultant product are maintained. A relatively low molecular weight polyester may be formed from the usual saturated dicarboxylic acid such as adipic, sebacic, azaleic, and the like, with glycols or polyhydroxy alcohols such as the butanediols, glycerine, pentaerythritol, and the like. The resulting polyester is then reacted with an excess of a diisocyanate to form the plasticizer having the properties stated. It is necessary that the plasticizer contain oxygen if it is to be compatible in all proportions with the polyurethane-polyether described earlier. The term oxygen-containing, isocyanato-terminated polyurethane as used in the present specification and claims is intended to denote the two above-described plasticizers.

The amount of polyurethane to be used to plasticize the polyurethane-polyether is not critical. As a broad range, 5–60 parts by weight polyurethane per 100 parts by weight polyurethane-polyether may be used. Amounts less than about 5 parts by weight do not give a significant plasticizing effect, while amounts greater than about 60 parts by weight yield a composition that is generally too soupy to be worked on a mill. The preferred range is about 15–45 parts by weight polyurethane per 100 parts by weight polyurethane-polyether.

It has been pointed out that the noncuring plasticizers exert an effect on the final product. It has been found that a desired amount of softness may be imparted to the final product by the addition of a noncuring plasticizer, which addition still does not significantly affect the processibility of the polyurethane-polyether. It is, therefore, one of the advantages of the present invention that a rubber-type plasticizer such as a butadiene-acrylonitrile copolymer may be added to control the properties of the final product, and the curable polyurethane plasticizer may be added to control the properties during processing; the two plasticizers thus each serves its own role without affecting the role of the other. Where textile roll covers are the end use of the final product, it has been found desirable to add about 0–35 parts by weight of butadiene-acrylonitrile copolymer per 100 parts by weight polyurethane-polyether polymer; preferably about 10–20 parts by weight of the copolymer are added. In place of the butadiene-acrylonitrile copolymer there may be added the usual plasticizers such as dioctyl phthalate, tricresyl phosphate, and others well-known in the art. It must be emphasized again that if sufficient of these plasticizers is added to significantly affect the processibility of the polyurethane-polyether on the mill, then the properties of the final product suffer. Thus the present invention contemplates the use of a curable polyurethane as a partial or total plasticizer for polyurethane-polyether polymers to permit reduction of in-process viscosity of the mixture without detracting from the vulcanized physical properties of the final cured polyurethane-polyether.

The usual fillers such as carbon black and/or silica may be used in accordance with the art. Pigments may be added if desired. The only restriction on the use of pigments and fillers is that such additives should not detract from the properties of the cured product and should not be reactive with diisocyanates. Different fillers give different properties in the final product as is well-known in the rubber art.

The compounding of the composition of the present invention may be accomplished by known methods. The polyurethane-polyether is banded on a cold mill; a release agent may be added. Next there is added any filler and any of the usual noncuring plasticizers, followed by the curable isocyanato-terminated polyurethane. The mixture is well-blended, and there is then added an organic diisocyanate having no reactive groups on the molecule except for the isocyanato groups. This blend is well-mixed on the mill, maintaining the temperature as low as possible. The blend is discharged, shaped into the desired form, and cured, preferably at elevated temperatures. Curing will proceed over a wide range of temperatures. At room temperature, the cure is very slow, whereas at 330° F., the cure proceeds rapidly. A textile cot will cure in an oven maintained at 275° F. in 30 minutes. Depending on the final product, however, cure may be carried out by heating, as in a press, in an oven, or the like.

The amount of organic diisocyanate used to cross link the composition will vary, depending on the tightness of the network desired in the final product. It has been found that 1–10 parts by weight of the diisocyanate per 100 parts by weight polyurethane-polyether will suffice while the preferred range is 2–5 parts diisocyanate per 100 parts polyurethane-polyether. The amount of organic diisocyanate to be added will be influenced to some extent by the particular diisocyanate chosen. Examples of such diisocyanates are 4,4'-diphenyl diisocyanate, 4,4'-diphenylene methane diisocyanate, 4,4'-tolidene diisocyanate, the naphthalene diisocyanates, and p-phenylene diisocyanate. Since the mix on the mill will grow warm, despite all precautions to keep it cool, it may be preferable to use an organic diisocyanate which becomes active at higher temperatures. Stearically hindered organic diisocyanates—that is, those having alkyl groups adjacent to each isocyanato group such as 4,4'-methylenedi-o-tolylisocyanate, may be particularly desirable in this respect.

The mechanism of cure in the final product is complex and not well understood. The reactive ingredients include the hydroxyl-terminated polyurethane-polyether, the isocyanato-terminated polyurethane, and the organic diisocyanate. It is postulated that these three ingredients react with one another to accomplish both chain extension of the polyurethane and cross linking of the extended molecule and of the polyurethane-polyether.

The role of water can be important in the formation of such networks. As little as about 0.1% water will form rubberlike products when present in isocyanato-terminated polyesters, for instance, those formed from glycol and adipic acid. This has been reported by Bayer et al., Angewandte Chemie, volume 62, No. 3, page 57–56, February 7, 1950. In the present process, however, it is not seen how water can play a significant role. The hydroxyl-terminated polyurethane-polyether is perfectly stable under all normal atmospheric conditions. When the dry material is banded on a cold mill, the temperature levels off at about 80° C., with full cooling water on the mill. Fillers and normal plasticizers may be dried and added at this temperature, followed by the addition of the isocyanato-terminated polyurethane plasticizer. This latter plasticizer is unstable and highly water-sensitive. It must be stored under conditions which protect it from the air. However, when it is removed from a sealed container and immediately placed in the milled mixture in the proper proportions, it is assumed that little or no water can be present. The organic diisocyanate is immediately added, the mix thoroughly blended, shaped, and immediately vulcanized or cured in an oven at elevated temperatures. Thus, it would seem that water, even in extremely small amounts, could have little or no effect on the cure of this system.

As mentioned earlier, the products of the present invention have many uses. In particular, they make excellent resilient fiber processing roll covers such as drawing, roving, and spinning cots. More particularly, they make excellent twister cots; a twister cot is a cot for handling twisted yarn, which type of yarn subjects the cot to unusually high abrasive conditions.

The following examples illustrate several embodiments of the invention. All parts are by weight unless otherwise stated.

Example I

Onto a mill with full cooling water is placed 100 parts of a solid stable hydroxyl-terminated polyurethane-polyether. After breaking up the rubber for a few minutes, there is added 10 parts dried carbon black and 10 parts liquid butadiene-acrylonitrile copolymer containing about 32% acrylonitrile. The mix is well blended, and there is then added 4 parts of 4,4'-methylenedi-o-tolylisocyanate.

As the mix is processed, the build-up of heat is quite noticeable and the viscosity of the mix is substantial. The mix is removed from the mill with difficulty and cooled to room temperature. The mix does not adhere to itself as much as desirable. The cooled mix is shaped into a textile cot with great difficulty and is cured at 275° F. for 30 minutes. An excellent twister cot results.

This example illustrates the difficulties encountered in working with the composition which does not contain a polyurethane plasticizer.

Example II

Example I is repeated, save there is additionally used 30 parts of an isocyanato-terminated polyurethane having a molecular weight in the range of 2,600–2,800 and a viscosity of about 2,500 centipoises at 70° C. The total composition is as follows:

| | |
|---|---|
| Polyurethane-polyether | 100 |
| Silica, fine particle size | 10 |
| Butadiene-acrylonitrile copolymer | 10 |
| Isocyanato-terminated polyurethane | 30 |
| 4,4'-methylenedi-o-tolylisocyanate | 4 |

The viscosity on the mill is substantially lower than that encountered in Example I; much less heat is generated. When the mix is removed from the mill, it adheres well to itself and can easily be processed into a textile cot. On curing as in Example I, a cot substantially identical to the cot prepared in Example I is produced. An additional advantage of the cot prepared in Example II, however, is that at higher elongation of about 200–400% the cot has a higher modulus of elasticity and a higher tensile strength as compared with the cot of Example I.

Example III

Example II is repeated except that 20 parts of the isocyanato-terminated polyurethane is used. The viscosity of the mix on the mill is slightly higher than in Example II but is substantially lower than in Example I. The cooled blended mix can be easily processed to form a textile cot having excellent properties.

Example IV

Example II is repeated save that 50 parts of the isocyanato-terminated polyurethane is used. Both the viscosity and amount of heat generated are substantially less in Examples II and III. An easily processible mix results, which forms an excellent textile cot.

*Example V*

Example II is repeated save that 2 parts of 4,4'-methylenedi-o-tolylisocyanate is added. An excellent cot slightly softer than the cot formed in Example II results after cure. When Example II is repeated save that 6 parts of the tolylisocyanate is added, an excellent cot, harder than the cot of Example II, results.

I claim:

1. The method of plasticizing a stable hydroxyl-terminated polyurethane-polyether which is the reaction product of ring-opened tetrahydrofurane, a polyhydroxyl alcohol, and a symmetrical polycyclic aromatic diisocyanate, which comprises intimately mixing relative proportions of about 100 parts by weight of said polyurethane-polyether with about 5-60 parts by weight of an isocyanato-terminated polyurethane having a molecular weight in the range of about 1,500–4,500 and having a viscosity in the range of about 1,000–20,000 centipoises at 70° C., said isocyanato-terminated polyurethane being the reaction product of an organic diisocyanate and a compound selected from the group consisting of (1) a polyether resulting from the ring-opening of tetrahydrofurane and (2) a polyester which is the reaction product of a saturated dicarboxylic acid and a polyhydroxy alcohol.

2. The method according to claim 1 wherein there is used about 15–45 parts by weight of said polyurethane per 100 parts by weight of said polyurethane-polyether.

3. The method according to claim 1 wherein said polyurethane is a polyether.

4. The method according to claim 1 wherein said polyurethane is a polyester.

5. The method according to claim 1 followed by the step of adding an organic diisocyanate in an amount sufficient to cure the final product to a hard rubbery state, and so curing said composition.

6. The composition produced by the method of claim 1.

7. The method of processing a stable hydroxyl-terminated polyurethane-polyether which is the reaction product of ring-opened tetrahydrofurane, a polyhydroxy alcohol, and a symmetrical polycyclic aromatic diisocyanate, which comprises intimately mixing relative proportions of about 100 parts by weight of said polyurethane-polyether with about 5-60 parts by weight of an isocyanato-terminated polyurethane having a molecular weight in the range of about 2,500-3,500 and having a viscosity in the range of about 2,000-3,000 centipoises at 70° C., and with an additional noncuring plasticizer compatible with said polyurethane-polyether, said isocyanato-terminated polyurethane being the reaction product of an organic diisocyanate and a compound selected from the group consisting of (1) a polyether resulting from the ring-opening of tetrahydrofurane and (2) a polyester which is the reaction product of a saturated dicarboxylic acid and a polyhydroxy alcohol.

8. The method according to claim 7 wherein said additional plasticizer comprises a liquid butadiene-acrylonitrile copolymer.

9. The composition produced by the method of claim 7.

10. The method of forming a processible composition of matter comprising admixing in relative proportions about 100 parts by weight of a stable hydroxyl-terminated polyurethane-polyether which is the reaction product of ring-opened tetrahydrofurane, a polyhydroxy alcohol, and a symmetrical polycyclic aromatic diisocyanate, about 1-30 parts by weight filler selected from the group consisting of carbon black and silica, about 1-35 parts by weight plasticizer compatible with said polyurethane-polyether, about 5-60 parts by weight of an isocyanato-terminated polyurethane having a molecular weight in the range of about 2,500-3,500 and having a viscosity in the range of about 2,000-3,000 centipoises at 70° C., and about 1-10 parts by weight organic diisocyanate whose sole reactive constituents are isocyanate groups, said isocyanato-terminated polyurethane being the reaction product of an organic diisocyanate and a compound selected from the group consisting of (1) a polyether resulting from the ring-opening of tetrahydrofurane and (2) a polyester which is the reaction product of a saturated dicarboxylic acid and a polyhydroxy alcohol.

11. The composition produced by the method of claim 10.

References Cited in the file of this patent

FOREIGN PATENTS

| | | |
|---|---|---|
| 644,829 | Great Britain | Oct. 18, 1950 |
| 649,928 | Great Britain | Feb. 7, 1951 |